United States Patent [19]

Oldham

[11] Patent Number: 4,681,718
[45] Date of Patent: Jul. 21, 1987

[54] METHOD OF FABRICATING COMPOSITE OR ENCAPSULATED ARTICLES

[75] Inventor: Susan L. Oldham, Long Beach, Calif.

[73] Assignee: Hughes Aircraft Company, Los Angeles, Calif.

[21] Appl. No.: 770,917

[22] Filed: Aug. 30, 1985

Related U.S. Application Data

[63] Continuation-in-part of Ser. No. 608,614, May 9, 1984, abandoned.

[51] Int. Cl.$^4$ .................... B29C 39/10; B29C 39/24; B29C 39/42
[52] U.S. Cl. .................... 264/102; 264/500; 264/548; 264/272.11; 264/272.13; 264/331.12; 264/331.16
[58] Field of Search .......... 264/102, 500, 548, 272.11, 264/272.13, 331.12, 331.16

[56] References Cited

U.S. PATENT DOCUMENTS

| | | | |
|---|---|---|---|
| 3,028,284 | 4/1962 | Reeves | 156/213 |
| 3,541,194 | 11/1970 | Resnick | 264/71 |
| 4,289,722 | 9/1981 | Tranbarger | 264/102 |
| 4,321,418 | 3/1982 | Dran et al. | 264/102 X |
| 4,333,900 | 6/1982 | Carey | 264/102 X |
| 4,374,080 | 2/1983 | Schroeder | 264/102 |

FOREIGN PATENT DOCUMENTS

| | | |
|---|---|---|
| 1305243 | 8/1962 | France . |
| 1330854 | 5/1963 | France . |
| 47-30797 | 11/1972 | Japan . |
| 502886 | 3/1971 | Switzerland . |
| 903734 | 8/1962 | United Kingdom . |
| 1108595 | 4/1968 | United Kingdom . |
| 1111436 | 4/1968 | United Kingdom . |

OTHER PUBLICATIONS

Katz, H. S. and J. V. Milewski, *Handbook of Fillers and Reinforcements for Plastics*, New York, Van Nostrand Reinhold, ®1978, pp. 66-78; 326-330.

*Primary Examiner*—Philip Anderson
*Attorney, Agent, or Firm*—M. E. Lachman; A. W. Karamebelas

[57] ABSTRACT

A method for encapsulating an electrical component or forming a resin based filler reinforced composite article which comprises providing a rigid mold having a cavity and an opening in one surface of the mold connected to the cavity, and a chamber in which the mold is placed for applying heat and varying pressure to the mold contents. The chamber is preheated to the curing temperature of the resin and is maintained at this temperature. The component or filler is loaded into the mold cavity and the mold is placed in the preheated chamber. Then the mold cavity is filled with a low viscosity heat curable, thermosetting resin such as an epoxy resin. Next, the mold cavity is evacuated to a subatmospheric pressure to impose a vacuum on the mold to impregnate the component or filler with the resin, degas the mold cavity contents, and expand any voids in the resin. The vacuum is released to atmospheric pressure to collapse any gas bubbles remaining in the mold contents. Then, a superatmospheric pressure is applied to the mold to burst any gas bubbles and cause the resin to compact and encapsulate the component or filler. The temperature and the superatmospheric pressure are maintained for a time sufficient to partially cure the resin and form a unitary structure which can be ejected from the mold. The ejected structure is then subjected to further heating to completely cure the resin. The method may be performed in cyclic fashion to form continuously in sequence a plurality of encapsulated components or composite articles.

Composite articles so formed are useful as structures, such as antenna waveguides, for space applications. Electrical components encapsulated by the process of the present invention have high voltage resistance.

25 Claims, 1 Drawing Figure

METHOD OF FABRICATING COMPOSITE OR ENCAPSULATED ARTICLES

This application is a continuation-in-part of patent application Ser. No. 608,614, filed May 9, 1984 now abandoned.

BACKGROUND OF THE INVENTION

1. Field of the Invention

This invention relates to a method of fabricating lightweight, composite materials, as well as to a method of encapsulating electrical components to provide increased resistance to electrical stress. More particularly with regard to the former, this invention relates to a method of preparing epoxy resin based filler reinforced composite members exhibiting improved performance characteristics such as reduced weight and thermal expansion coefficients.

2. Description of the Prior Art

The successful utilization of filler reinforced composites in aerospace applications, such as antenna fabrication, imposes several important requirements on the filler reinforced composite. A feature of primary importance is that the composite have strength and dimensional stability characteristics (e.g. a low linear coefficient of thermal expansion) calculated to withstand the rigors of environmental temperature cycling.

In addition, for complex structures such as antennae, structures molded from epoxy resin based composites are preferred over metal structures since the composite can be molded directly, thereby avoiding costly machining operations. Glass and graphite fiber reinforced epoxy based composites are finding growing use in aerospace applications because of their high strength-to-weight ratio. These composite materials, because of their relatively low coefficient of thermal expansion ($\alpha$), find wide application in structural components such as antenna used in space. Such materials are described, for example, by H. S. Katz and J. V. Milewski, in the book entitled "Handbook of Fillers and Reinforcements for Plastics," Chapter 19, Hollow Spherical Fillers, Van Nostrand Reinhold Company, New York, 1978, pages 326 to 330. In a space environment where one face of the structural member is subjected to constant sunlight while the opposite face of the member is in darkness, the face exposed to sunlight is heated considerably more than the opposed face. Such non-uniform heating causes uneven expansions of the structural members making up the antenna with the resultant distortion of the antenna from its desired shape. Thus, aerospace use requires that some critical antenna structural components exhibit a dimensional stability over a ten year lifetime in the operating range of 54° to 115° F. (12° to 46° C.) and have densities equal to or less than 0.9 grams/cm$^3$. When the structural components are electroplated with a metal layer to provide, for example, utility as a electromagnetic interference (EMI) shielding or a conductive path in an antenna waveguide structure, the metal coating layer must also withstand thermal cycling in the extremes of the space environment without loss of adhesion.

Furthermore, in another area of current interest, it is recognized that high voltage power supplies and pulse forming networks for aerospace use must meet high standards of performance and reliability for long periods under extreme environmental conditions. To assure trouble-free operation of components within the assembly, the components, such as magnetic coils, capacitors, diode arrays, transformers, stator generators, and resistor networks, are commonly encapsulated with synthetic resin materials to provide electrical insulation to the components. Such encapsulants for electrical and electronic components are described, for example, in the book by Katz et al, previously referenced, at page 327. The conventional encapsulation processes used are batch processes, i.e., processes which are not in continuous production, but rather are carried out on a limited number of items at one time.

Because of their excellent adhesion, good mechanical, humidity and chemical properties, epoxy resins are used extensively both as encapsulants for electronic components and in combination with glass and graphite fibers and microballoons in the manufacture of the previously discussed high performance reinforced composite structures, such as antenna. The encapsulated article or filled epoxy resin composite is molded using conventional molding techniques, such as compression molding or transfer molding, in which the required materials including the resin are loaded into a mold, and curing of the resin is effected under increased pressure, with the load being applied directly to the mold by the action of a contained media, namely a gas for pneumatic pressure or a liquid for hydraulic pressure. In compression molding, the pressure is applied to a platen which then presses on an opening in the mold which communicates with the mold cavity. In transfer molding, the pressure is applied to a transfer ram which then presses on the mold contents through the opening in the mold. Problems encountered in the molding of the epoxy systems and especially filled epoxy resin systems have limited the use of these resins as encapsulants, as well as for the fabrication of structural composites useful in a space environment. In molding filler reinforced composites, the problem is aggravated due to the fact that high filler loadings, e.g. 40 to 60 percent by weight, are required in the epoxy resin based composite structures to achieve the required low $\alpha$ value and corresponding high dimensional stability. Thus, when using transfer molding or batch encapsulation techniques, the use of high filler contents in the epoxy system impedes adequate resin flow into the mold because of the high viscosity of such a resin system. This, in turn, results in varying filler orientations and distributions within the geometrical areas in the complex structures being molded, with a resultant loss in $\alpha$ and ultimate dimensional stability, as well as erratic adhesion of metal layers plated on the surfaces of the structure. This problem is further aggravated when hollow particulates such as glass or graphite microballoons are used as filler materials since the high viscosity filled epoxy resin may have unpredictable densities due to microballoon fractures and voids in the filler/resin mixture. Further, high viscosity resins are unable to penetrate and impregnate the filler to provide homogenous systems.

In addition, with regard to encapsulants for electrical components, state-of-the-art heat curable epoxy resin systems used as encapsulating resins have the disadvantage that the viscosity of the resin at working temperatures, e.g. 100° C., (75° F.), are quite high, e.g., 500 centipoise (cps), and such resins are not intruded completely into crevices present in the electrical component. Thus, the insulation is often incomplete and defective.

It is the primary object of the present invention to provide a method for molding filled thermosetting resins such as polyimides, bismaleimides, and particularly epoxy resins, to provide resin based filler reinforced composite structural components which have a low coefficient of thermal expansion rendering the composite relatively insensitive to environmental temperature cycling while possessing desirable performance properties of low density, high strength, and amenability to the plating of adherent metal films and coatings.

It is a further object of the present invention to provide a method for encapsulating electrical components or devices to provide components or devices having improved reliability and improved electrical properties.

Another object of the present invention is to provide methods of the type described above which can be performed in cyclic and continuous fashion.

SUMMARY OF THE INVENTION

The above objectives are achieved in accordance with the present invention, which is directed to a method for encapsulating an electrical component or forming a resin based filler reinforced composite article which comprises providing a rigid mold having a cavity and an opening in one surface of the mold connected to the cavity, and a chamber in which the mold is placed for applying heat and varying pressure to the mold contents. The chamber is preheated to the curing temperature of the resin and is maintained at this temperature. The component or filler is loaded into the mold cavity and the mold is placed in the preheated chamber. Then the mold cavity is filled with a low viscosity heat curable, thermosetting resin such as an epoxy resin. Next, the mold cavity is evacuated to a subatmospheric pressure to impose a vacuum on the mold to impregnate the component or filler with the resin, degas the mold cavity contents, and expand any voids in the resin. The vacuum is released to atmospheric pressure to collapse any gas bubbles remaining in the mold contents. Then, a superatmospheric pressure is applied to the mold to burst any gas bubbles and cause the resin to compact and encapsulate the component or filler. The temperature and the superatmospheric pressure are maintained for a time sufficient to partially cure the resin and form a unitary structure which can be ejected from the mold. The ejected structure is then subjected to further heating to completely cure the resin. The method may be performed in cyclic fashion to form continuously in sequence a plurality of encapsulated components or composite articles.

BRIEF DESCRIPTION OF THE DRAWING

The FIGURE presents a flow chart representation of the process steps for two preferred embodiments of the present invention.

DETAILED DESCRIPTION OF THE INVENTION

The heat curable, thermosetting resins employed in the molding compositions used in this invention can be any low-viscosity, liquid heat curable resin. Preferred heat curable resins are low-viscosity epoxy resins having 1,2 epoxy groups or mixtures of such resins, and include cycloaliphatic epoxy resins, such as the glycidyl ethers of polyphenols, epoxy resins, liquid bisphenol-A diglycidyl ether epoxy resins (such as that sold under trademark as EPON 815 by Shell Chemical Company). In addition, other resin compositions, such as polyimide compositions and bismaleimide compositions, having appropriate viscosities, gel times, green strengths, and dielectric properties may be used in the practice of the present invention.

Epoxy resins preferred in the practice of the method of the present invention are polyglycidyl aromatic amines, i.e. N-glycidyl amino compounds conventionally prepared by reacting a halohydrin such as epichlorohydrin with an amine. Examples of those preferred polyglycidyl aromatic amines include diglycidyl aniline, diglycidyl orthotoluidine and tetraglycidyl meta-xylylene diamine.

The epoxy resins are admixed with polyfunctional curing agents to provide heat curable epoxy resins which are cross-linkable at a moderate temperature, e.g. about 100° C., to form thermoset articles. Suitable polyfunctional curing agents include polycarboxylic acid anhydrides of which nadic methyl anhydride (i.e. a maleic anhydride adduct of methyl cyclopentadiene), methyl tetrahydrophthalic anhydride and methyl hexahydrophthalic anhydride are exemplary. Polycarboxylic acid anhydride compounds are preferred curing agents for polyglydicyl aromatic amine based epoxy resins. In preparing heat curable, thermosetting epoxy resin compositions, the epoxy resin is mixed with the curing agent in proportions from about 0.6 to about 1.0 of the stoichiometric proportions.

Cure accelerators can be employed in preparing the heat curable epoxy resin formulations, and in particular when using polycarboxylic acid anhydrides as curing agents, the preferred accelerators include substituted imidazoles such as 2-ethyl-4-methyl imidazole and organometallic compounds such as stannous octoate, cobalt octoate, and dibutyl tin dilaurate.

Preferred epoxy resin compositions useful in the practice of the present invention and comprising the above-described preferred epoxy resin, curing agent, and accelerator are disclosed in my U.S. Pat. No. 4,559,272, assigned to the present assignee. This resin is particularly useful for providing high electric stress-resistant encapsulated components.

The term "curing" as used herein denotes the conversion of the thermosetting resin into an insoluble and infusible crosslinked product and, as a rule, with simultaneous shaping to give shaped articles.

To prepare resin based filler reinforced composite articles in accordance with one embodiment of the present invention, the epoxy resin in admixture with the curing agent and accelerator may be further mixed before curing with fillers and reinforcing agents, as for example, glass fibers, carbon fibers, graphite fibers, Kevlar fibers, ceramic fibers such as $Al_2O_3$ or $Al_2O_3/SiO_2$, ceramic whiskers such as silicon carbide or silicon nitride, glass microballoons, carbon microballons, phenolic microballoons, ceramic particles, or glass particles, and the mixture is loaded into the mold. However, it is preferred in the practice of the method of the present invention that the mold be prepacked with the filler, i.e. the filler is added first to the mold, followed by the addition of the heat curable resin. If the filler is premixed with the resin and then loaded into the mold, a cured composite with varying filler orientations and distributions within the different geometrical areas of the mold is produced. In the preferred embodiment of the present invention, the components of the filler, such as fibers and microballoons, are pretreated with a titanate or zirconate wetting agent and/or a silane or zircoaluminate sizing agent as discussed below and are mixed mechanically or manually to form a homogenous mixture, which is then added to the mold cavity. Next, the mold may optionally be vibrated to promote a uniform distribution of the filler in the mold. It has been found by using packing theory that an increased volume percent solids in the resin mixture can be achieved. Packing theory is based on the concept that, since the largest particle size filler in a particular reinforcement system packs to produce the gross volume of the system, the addition of succeedingly smaller particles can be done in such a way as to simply occupy the voids between the larger filler without expanding the total volume. This theory is discussed by Harry S. Katz and John V. Milewski, in the book entitled "Handbook of Fillers and Reinforcements for Plastic," Chapter 4, Packing Concepts in Utilization of Filler and Reinforcement Combinations, Van Nostrand Reinhold, 1978. The fillers used in the present invention are chosen on the basis of particle size, shape, and contribution to overall composite properties. This theory applies to the use of solid particulates as well as hollow spheres. Because of the high viscosity of such a highly loaded resin, the mixture could not flow into the mold without damaging the microspheres. To overcome this problem, the mold is pre-packed with the dry filler (i.e. a mixture of microspheres, fibers, and/or whiskers). By applying packing theory as described above, the filler can be packed at a high density and so that segregation of ingredients does not occur. The use of maximum filler loading with a very low viscosity resin and appropriate coupling agents (for good filler-matrix adhesion) results in a material which, when vacuum liquid transfer molded as described herein, provides homogenous, void-free structures.

The composite article formed in accordance with the preferred process embodiment of the present invention is referred to herein as a "fiber reinforced syntactic foam composite," which denotes a composite of a syntactic foam (i.e. a non-porous structure made by incorporating hollow spheres in a liquid resin) and reinforcing fibers dispersed throughout the syntactic foam. The composite article formed in accordance with the present invention is also referred to herein in a more general sense as a "resin based filler reinforced composite," which indicates a composite of a resin and reinforcing filler material.

The compositions of preferred mixtures of resin, fibers, and microspheres used to form fiber-reinforced syntactic foam composites in accordance with one embodiment of the present are discussed in detail in co-pending patent application Ser. No. 607,847 and U.S. Pat. No. 4,568,603 assigned to the present assignee. Preferred filler materials are fibers and/or whiskers of predetermined length and hollow microspheres of predetermined diameter as discussed in the above-noted copending patent applications. The fibers may be formed of graphite, glass, carbon, ceramic or polyamide, while the hollow microspheres may be formed of glass, silica, phenolic or carbon. The whiskers may be formed of such materials as metal oxides, carbides, halides or nitrides, such as silicon carbide, silicon nitride, sapphire ($Al_2O_3$), MgO, $MgO-Al_2O_3$, $Fe_2O_3$, BeO, $MoO_3$, NiO, $Cr_2O_3$, ZnO, potassium titanate, or boron. The term "whiskers" is defined in Katz and Milewski, previously referenced, at pages 446-453 as "fibers grown under controlled conditions that lead to the formation of a single crystal" and having minimum length-to-diameter ratios of 10:1 and maximal cross-sectional areas of $7.9 \times 10^{-5}$ in.$^2$ (corresponding to circular cross-sections of 0.010 in. diameter). Typical whiskers have a diameter of less than one micrometer and high aspect ratios. The internal and surface perfection of whiskers gives them high toughness and nonfriability in handling, high tensile strengths and Young's moduli as compared to fiberglass or polycrystalline fibers. For the discussion herein unless otherwise noted, whiskers are included in the term "fibers".

Carbon fibers useful as reinforcing agents in molding the present filler reinforced composites are high strength, high modulus fibers composed essentially of amorphous carbon but more preferably of graphite or pyrolytic graphite and generally referred to as graphite fiber. One type of graphite fiber which may be used in reinforcing the composites are HM-S graphite fibers (available from the Courtaulds Company of the United Kingdom) which have the following dimensions and physical properties:

Modulus: 50 million psi
 (stress/strain): ($3.45 \times 10^{11}$ pascals)
Length: 50 micrometers ($\mu$)
Density: 1.83 gm/cm$^3$
Diameter: 8 micrometers Whiskers which are particularly useful in practising the present invention comprise silicon carbide. One type of such whiskers are Silar SC-9 (available from ARCO Metals Company, a Division of Atlantic Richfield Company) which have the following dimensions and physical properties:

Modulus: 70 to 120 million psi
 (stress/strain): ($4.83 \times 10^{11}$ to $8.27 \times 10^{11}$ pascals)
Length: 10 to 80 micrometers
Diameter: 0.8 micrometers
Density: 3.2 gm/cm$^3$ Glass microballoons or hollow microspheres used as fillers are composed essentially of silica and typical glass microballoons which may be used have the following dimensions and physical properties:

Diameter: 10-200$\mu$
Density: 0.15 to 0.32 gm/cm$^2$

Carbon microballoons are composed primarily of thin-walled carbon balloons and typical ones which may be used have the following dimensions and physical properties:

Diameter: 40$\mu$
Density: 0.32 gm/cm$^3$

As is known to the art, wetting of fillers, such as graphite fibers, by epoxy resins can be facilitated by the use of titanate wetting agents such as di(dioctylpyrophosphato)ethylene titanate (KR238M available from Kenrich Petrochemical Company of Bayonne, N.J.), tetra(2,2-diallyloxymethyl 1-butoxy) titanium di(ditridecyl) phosphite (KR55 available from Kenrich) or titanium di(cumylphenylate)oxyacetate (KR134S, available from Kenrich), whereby compaction and resin penetration of the filler by the resin is enhanced by the presence of such agents, and the use of such sizing and wetting agents represents a preferred practice of the present invention. Coupling agents, such as silanes and zircoaluminates, may be used in conjunction with the titanates to achieve a chemical bond between the organic resin and the inorganic fillers/fibers. The sizing and wetting agents may be dissolved in the mixture of resin, microspheres and fibers; or, preferably they are applied to a mixture of the microspheres and fibers in predetermined proportions by immersing this mixture in a solution of the sizing agent, followed by filtering and drying the mixture to provide a pretreated microsphere/fiber mixture.

The following formulations show the range of proportions, in percent by weight and percent by volume, of the components which a filled heat curable epoxy resin formulation may suitably contain for use in the molding of filler reinforced composite articles in accordance with the process of the present invention. It should be noted that other resin-fiber-microsphere mixtures besides those specifically shown may also be used and may be adjusted to meet particular end use requirements.

| Component | Wt. % | Vol. % |
| --- | --- | --- |
| Epoxy Composition | 50-75 | 23-60 |
| Filler (graphite fiber, and/or whiskers, and microballoons) with overall density of 0.33 to 0.54 | 20-50 | 38-77 |
| Sizing Agent (organic titanate) | 0-3 | 0-2 |

To form the epoxy composition, the epoxy resin, curing agent and curing accelerator chosen for the molding resin can be mixed in any conventional fashion. The curing agent can be mixed into the epoxy resin at room temperature. A solid curing agent in powdered form also can be admixed in the epoxy resin at room temperature by continuous agitation prior to mixing with the chosen epoxy resin.

The use of polyglycidyl aromatic amines as the epoxy resin component of the composite to be molded provides a low viscosity, solvent-free, liquid epoxy component. For example, polyglycidyl aromatic amines such as diglycidyl orthotoluidene combined with curing agents such as nadic methylanhydride have viscosities in the range of 125 to 500 centipoise (cps) when measured at 75° F. (24° C.). By using such low viscosity resins in the molding process of the present invention, total wetting and complete impregnation of the filler and voids therein is readily accomplished, resulting in homogeneous, void-free, composite structures.

Figure 1:
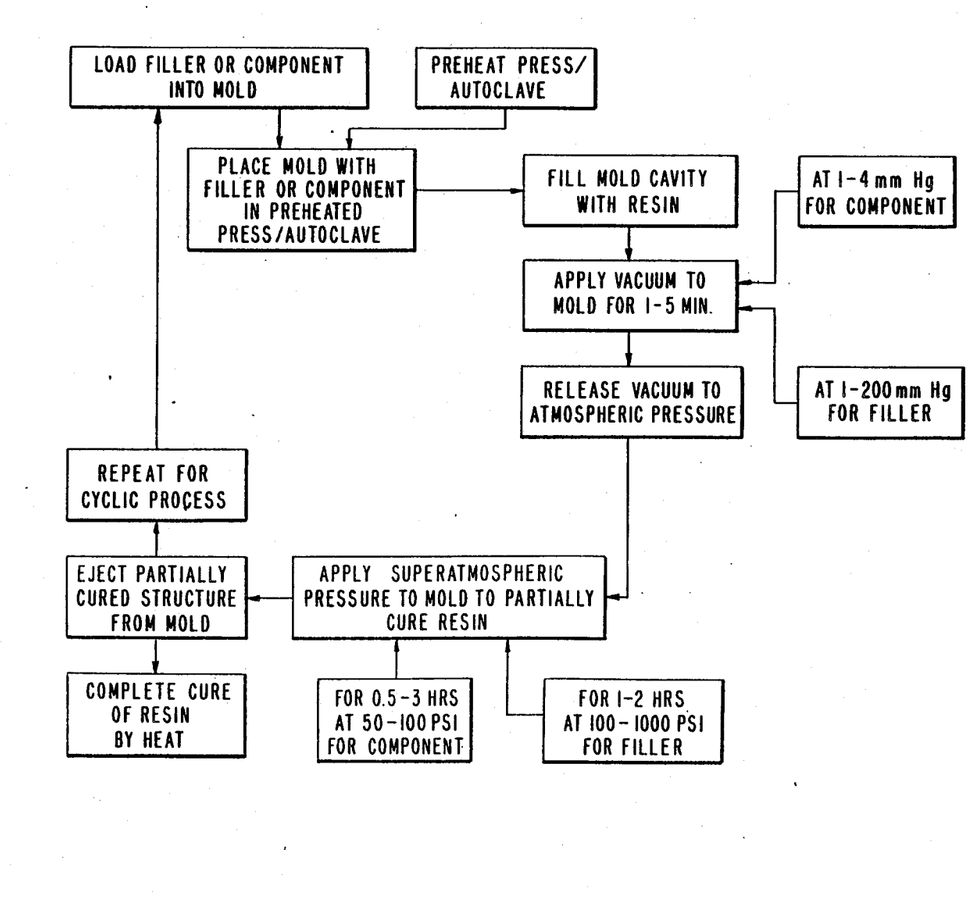

To prepare composite articles in accordance with the method of the present invention, as represented in the FIGURE, a suitable quantity of filler comprising, for example, premixed and pretreated fibers and/or whiskers, and microspheres as previously described, is loaded in a suitable mold cavity and the mold may optionally be vibrated to promote a uniform distribution of the filler in the mold. The mold is rigid and may be made, for example, of tool steel, internally coated with a release coating such as a fluorocarbon polymer, e.g., teflon, or sprayed prior to loading of the filler with a release agent such as polyvinyl alcohol. The mold may optionally be formed of another hard tooling (i.e. nondisposable) metal which is capable of withstanding the increased and decreased pressures used in the process of the present invention. The mold may be a single unit or a two-part mold in which the parts are separable. The shape of the mold cavity will, of course, determine the shape of the article molded therein. To prepare for the molding process, the press is preheated to a temperature at which the thermosetting resin formulation is curable and is maintained at this temperature. In the case of polyglycidyl aromatic amine based epoxy resin formulations, the press is preheated to to about 150° to 250° F. (66° to 122° C.). The loaded mold is placed in the press. A suitable quantity of the uncured resin, such as an epoxy resin formulated as described above, is introduced into the mold cavity in a quantity sufficient to fill the mold. The resin may be introduced under vacuum, such as less than about one millimeter of mercury, at atmospheric pressure, or under superatmospheric pressure. Introduction of the resin into the mold under vacuum is preferred. A subatmospheric pressure or vacuum is then applied to the press to draw on the mold, generally about 1 to about 200 mm Hg and preferably about 5-150 mm Hg to impregnate the filler and to expand bubbles of entrapped air or other gas in the resin contents during this "active vacuum" stage. When a laminating press or autoclave is used, a bag is constructed around the compression tooling to provide a vacuum chamber. The vacuum is drawn for about 1 to 5 minutes either on the autoclave, the vacuum bag and press, or the mold itself. The vacuum is then released to allow for collapse of any bubbles. (If a vacuum bag is used, the bag is vented to release the vacuum.) This "passive vacuum" stage is performed for about 1 to 5 minutes before any further molding steps are initiated. Next, a superatmospheric pressure on the order of about 100 to about 1000 psi (about $6.90 \times 10^5$ to $6.90 \times 10^6$ pascals) is imposed on the mold to burst any remaining bubbles and cause the filler to compact and the resin to encapsulate the filler. The increased pressure provides optimized flow of the resin into the interstices between the filler particles, as well as forcing excess resin out of the mold by use of a resin bleeding process. This latter pressurization step may be accomplished in a laminating or transfer press or an autoclave. When an autoclave is used, inert gas is pumped into the autoclave chamber, thereby pressurizing the mold. When a laminating press is used, the platens are moved into intimate contact with the mold and vented bag and a positive pressure is applied, either hydraulically or pneumatically. When a transfer press is used, the permanent mold of the transfer press acts as the vacuum pressure chamber, with pressurization being produced on the mold contents by activation of the transfer ram which exerts a compressing action that translates to the contents of the mold cavity. Under this pressure, the mold temperature is maintained at the temperature at which the thermosetting resin is curable, e.g., about 66° to about 121° C. (about 150° F. to about 250° F.) in the case of heat curable epoxy resins for a predetermined time period, e.g., about 1 to 2 hours, until the resin/filler mixture has sufficiently cured or has sufficient mechanical (green) strength to be ejected from the mold cavity as a unitary structure. By ejecting the "green" structure from the heated assembly, the mold is at once available for the introduction of another quantity of filler material and continuation of the process of the present invention in a cyclic fashion. The advantages of such a cyclic process are discussed hereinbelow with regard to the encapsulation of a component in accordance with the process of the present invention. The molded, partially cured composite is post-cured at the curing temperature or higher (e.g., about 250° to about 350° F. or about 121° to 177° C.) for 1.5 to 4 hours to fully cure the resin, in a suitable heating device such as an oven. In the post-cure step for filler reinforced composites, the molded composite article is generally cured in an unrestrained state. To avoid deformation of the composite caused by thermally induced sagging of the unrestrained composite, it has been found advantageous to heat the composite upon its removal from the mold at a rate of 3° to 5° F. (1.5° to 3° C.) per minute until the post-cure temperature is reached, and then cure the composite in an unrestrained condition at the postcure temperature for about 2 to about 5 hours.

In accordance with another embodiment of the present invention for encapsulating and impregnating an electrical component, as represented in the FIGURE, the general procedure described above for forming a composite article is followed except that the electrical component, such as a magnetic coil, rather than a filler material, is loaded into the transfer press or other pressurization chamber. The subatmospheric pressure used to produce impregnation of the coil or other electrical component is preferably about 1 to about 4 millimeters of mercury. The preferred superatmospheric pressure is about 50 to about 100 pounds per square inch (about $3.45 \times 10^5$ to $6.90 \times 10^5$ pascals), and the mold contents are subjected to this superatmospheric pressure at a temperature of about 66° to about 121° C. (about 150° to about 250° F.) for a heat curable epoxy resin for about 30 minutes to 3 hours. After the "green" structure is ejected from the mold, a second or subsequent electrical component can be immediately dropped through the opening in the mold into the mold cavity and encapsulated as described herein. Such a cyclic process permits the production of a large number of encapsulated devices in a relatively short period of time and is especially useful when partially or completely automated. Subsequent to ejection from the mold, the resin is post cured at about 275° F. to 325° F. (about 135° to 163° C.) for about 2 to 4 hours to ensure total curing and crosslinking of the resin composition.

In order to encapsulate a number of devices at one time, an individual mold having multiple cavities may be used, with one device being placed in each cavity. The individual mold or a number of individual molds are placed in the preheated permanent mold or chamber of the transfer press, the resin is introduced into the individual mold, and then vacuum or pressurization is applied to the mold in accordance with the process of the present invention. There are numerous advantages to be realized in practising the process of the present invention. When the process of the present invention is used to encapsulate electrical devices, matched molds are used to provide net parts, or parts having the desired final configuration, with negligible finishing operations being required. In addition, the fast cure time of the preferred resins described herein substantially reduces the molding time as compared to batch encapsulation. These latter two factors provide substantial savings in labor costs by using the process of the present invention rather than known batch encapsulation processes. Additional cost savings result from the use of less stringent vacuum in the present process as compared to known processes, which requires less expensive equipment for the present process, and the use of inexpensive but precise metal tooling. In addition, the present process can be precisely controlled, particularly when automated, and produces repeatable results, as well as uniform dimensions in the finished part. Moreover, when the cyclic or continuous embodiment of the present process is used, a large number of electric stress-resistant encapsulated components can be produced in considerably reduced time as compared to known batch encapsulation processes.

It should be noted that subatmospheric pressures and superatmospheric pressures other than those specifically noted above might be required in order to achieve impregnation and encapsulation of a particular device or material. For example, a tightly wound coil might require more extreme vacuum or pressurization than a less tightly wound coil. In addition, the viscosity or other physical properties of the particular resin used might also affect the subatmospheric pressure required to produce impregnation of the article or the superatmospheric pressure required to produce compaction and encapsulation of the article.

Further, it is recognized that such process details as the curing temperature, dwell time and postcure conditions, will depend, among other things, upon the composition of the particular resin used. The specific process details recited above for an epoxy resin are not intended to limit the present invention, but only to provide an example thereof. Moreover, it is recognized that the process of the present invention and, in particular, the cyclic embodiment thereof, may be partially or fully automated for use in a production environment.

In another alternative process embodiment of the present invention for encapsulating an article, the mold is first loaded with a predetermined quantity of filler and then the article to be encapsulated, such as an electrical component, is placed within the filler material so as to be surrounded by the filler. Then, the filled mold is placed in the preheated press, the resin is introduced into the mold, and the previously described procedure for encapsulating an electrical component is followed. The article so formed comprises the electrical component impregnated with the resin and having an overcoat a few mils thick of the resin based filler reinforced composite surrounding the component and integral therewith. Such a device has improved properties due to the filler overcoat which a resin coating alone cannot provide, such as improved thermal shock resistance and improved coefficient of thermal expansion. In addition, the use of the preferred resin noted herein provides high electric stress resistance in the device.

By practising the method of the present invention as discussed above, dimensionally stable, lightweight intricate resin based filler reinforced composite structures having homogeneous filler distributions are readily and consistently molded. Such composites are particularly useful for forming structures, such as antenna waveguides, for space applications.

In addition, in accordance with the present invention, electrical components can be encapsulated with an electrical insulation and passivation layer to provide high reliability, high voltage components.

Moreover, because of their relatively low coefficient of thermal expansion and high thermal conductivity, filled epoxy resin composite structures prepared in accordance with the method of the present invention have been determined to be especially amenable to metal plating processes when the surfaces thereof are prepared for electroless plating by plasma treatment. The relatively high adhesion of metal deposits to the composite surface is believed to be a function of both the topography of the plasma-treated surface plus the mechanical integrity of the remaining surface. Such metal plating may be required, as previously noted, to provide a conductive path in an antenna waveguide structure.

To effect plasma treatment, the surface of the filler reinforced epoxy resin based composite is subjected to a plasma process with a reaction gas containing a mixture of air, nitrogen, or argon with oxygen, water vapor, nitrous oxide, or other resin oxidizing source, to remove the polymer "skin" and expose the filler, which provides a surface that is readily platable. Normal plasma etching conditions known in the art are used. For example for a plasma excitation energy of 200 watts/ft² of composite, an O₂/inert gas source of approximately 1000 ml/minute, a vacuum pressure of 200μ Hg, and one hour duration are used.

Metal plating of the etched epoxy resin composite surface can be conveniently accomplished by electroless plating of the plasma-treated composite surface by standard procedures such as by dipping the treated composite in the plating solution for a time sufficient to achieve a uniform buildup of metal on the treated surface. Metals that can be plated on the molded epoxy resin based composites prepared in accordance with the present invention include copper, silver, nickel, cobalt, nickel/iron, nickel/cobalt, other nickel alloys and gold.

For electroless copper plating, for example, an aqueous bath of Shipley Co. #328 copper plating solution may be used, which contains copper sulfate, sodium potassium tartrate, and sodium hydroxide. Other electroless copper plating formulations can also be employed. The plating bath is agitated or stirred prior to immersion of the plasma-treated composite. Preferred plating temperatures are in the range of about 15° to about 95° C. (about 59° F. to 203° F.). Metal adhesion is excellent even after exposure of the plated composite to cycles of widely different temperatures, as described in Examples 1 and 2 herein.

After an electroless copper plate has been formed on the composite of the present invention to provide a conductive surface, the copper plating may be built up to any desired thickness to provide a smooth surface finish, using known electrolytic plating solutions and methods; and followed by electrolytic plating of a second metal, such as silver, on the electrolytic copper plate using known solutions and methods. Such a silver layer may advantageously be used in antenna waveguide structure.

The following Examples illustrate, but do not limit the present invention.

EXAMPLE 1

A heat curable epoxy resin formulation was prepared as disclosed in my U.S. Pat. No. 4,559,272 and had the following composition:

| Resin Component | WT. (gms.) |
| --- | --- |
| Diglycidyl orthotoluidine | 100 |
| Nadic methylanhydride | 100 |
| 2-ethyl-4-methyl imidazole | 2 |

This composition had a gel time of 25 minutes and a viscosity of 220 centipoise at 75° F. (24° C.).

A filler mixture was prepared having the composition shown below and a density of 0.543 gm/cm³.

| Filler Component | WT. (gms.) |
| --- | --- |
| Carbosphere hollow carbon microballoons, 50μ mean diameter | 50 |
| HM—S graphite fiber, ~50μ length | 50 |
| Titanate wetting agent KR238M | 1 |

Carbospheres are available from Versar Inc.; HM-S graphite fibers are available from Courtaulds Company of the United Kingdom; and KR238M is available from Kenrich Petrochemical Company.

Using the detailed procedure previously described, ten grams of the filler composition (i.e. a mixture of the fibers and microspheres pretreated with the wetting agent as previously discussed) were loaded into a cleaned 5.5 inch×0.5 inch (14 cm×1.3 cm) wide steel slab mold internally coated with a polyvinyl alcohol release agent and the mold was vibrated for about 5 minutes. A laminating press was preheated to 212° F. (100° C.), the temperature at which hardening of the heat curable epoxy resin formulation was initiated. Forty grams of the epoxy resin formulation were poured into the mold containing the filler. The mold was placed in the laminating press, a nylon vacuum bag was constructed around the compression tooling of the press, and a vacuum pressure of 125 millimeters (mm) mercury pressure was maintained on the assembly for 2 minutes to draw down the resin to impregnate the filler and to degas the resin materials in the mold. The vacuum was then released without removal of the vacuum bag and the assembly held in this passive vacuum state for an additional 2 minutes. Thereafter, a constant positive pressure of approximately 800 pounds per square inch (about 5.5×10⁶ pascals) was imposed on the resin/filler mixture in the mold for 75 minutes at 212° F. (100° C.). During this pressurization stage, 69% by weight of the resin was bled from the mold. The molded composite slab had sufficient green strength to be ejected from the mold, whereafter it was post cured for 4 hours unrestrained, in an oven set at 300° F. (149° C.). The final void-free slab contained 60% by weight (77% by volume) filler and was cut into appropriate shapes for physical testing. The composite was found to have the physical properties which are summarized in Table I.

TABLE I

Physical Properties of Composite

| Physical Property | Value |
| --- | --- |
| Density, gm/cm³ | 0.743 |
| Compressive strength (psi)[1] | 13,000 |
| Compressive modulus (psi)[2] | 700,000 |
| α, 10⁻⁶ in/in/°F.[3] | 3.6 |

[1]Determined by American Society for Testing and Materials Standard No. D695 (ASTM D695). 1 psi = 6.895 × 10³ pascals.
[2]Determined by ASTM D695, using crosshead speed.
[3]Determined using quartz dilatometer to measure the change in length as a function of temperature.

A portion of the molded slab was surface plated with copper by subjecting the surface of the slab to an oxygen rich plasma as previously described, which resulted in a surface weight loss of about 1.5 percent, taking into consideration moisture and resin removal. The plasma-treated slab was then dipped into Shipley #328, electroless copper plating solution, as previously described, and then dried at 248° F. (120° C.) under 29 inches (737mm) Hg (gauge pressure).

The plated composite was then evaluated for adhesion of the deposited copper layer using an ASTM D3359 tape adhesion test before and after 25 cycles of thermal shock imposed on the plated surface by alternately dipping the plated specimen in liquid nitrogen (−320° F. or −196° C.) for 30 seconds and boiling water (212° F. or 100° C.) for 10 seconds. No loss of copper was observed.

EXAMPLE 2

The procedure of Example 1 was repeated with the exception that the resin/filler mixture was maintained at 212° F. (100° C.) in the molding press for 2 hours using varying resin/filler ratios. The components of the molding compositions and the physical properties of the molded composites are summarized in Tables II and III, respectively. The definitions of Table I apply also to Table III.

TABLE II

| | | Components of Molding Compositions | | | |
|---|---|---|---|---|---|
| Specimen No. | Resin (gms.) | Filler (gms.) | Filler Ratio (Wt. %) | Filler Ratio (Vol. %)* | Resin Bleed During Molding (%) |
| 1 | 40 | 10 | 45 | 64 | 69.2 |
| 2 | 30 | 9.4 | 38 | 57 | 47.8 |
| 3 | 30 | 9.4 | 38 | 57 | 47.9 |

*Resin bleed $= \left(\dfrac{W_1 - W_2}{W_1}\right) 100$ where $W_1$ = initial resin weight
$W_2$ = resin displaced from the mold, using a bleeder cloth.
Vol. % calculated from resin bleed may vary up to 10–20% of the actual vol. % value.

TABLE III

| | Physical Properties of Molded Composites | | |
|---|---|---|---|
| Specimen No. | Thickness (in.) | Density gm/cm³ | α* 10⁻⁶ in/in/°C. |
| 1 | 0.478 | 0.743 | 6.6 |
| 2 | 0.550 | 0.900 | 16.2 |
| 3 | 0.565 | 0.876 | 14.2 |

*α of unfilled resin is $55.5–58.1 \times 10^{-6}$ /in/in °C.

EXAMPLE 3

The procedure of Example 2 was repeated with the exception that the titanate wetting agent used in the filler mixture was Kenrich KR 134S titanate. The use of KR 134S titanate was observed to provide better wetting of the filler mixture by the resin.

The components of the molding compositions and the physical properties of the molded composites are summarized in Tables IV and V, respectively. The definitions of Table II apply also to Table IV, while the definitions of Table I apply to Table V.

TABLE IV

| | | Components of Molding Compositions | | | |
|---|---|---|---|---|---|
| Specimen No. | Resin (gms.) | Filler (gms.) | Filler Ratio (Wt. %) | Filler Ratio (Vol. %) | Resin Bleed During Molding (%) |
| 4 | 17.0 | 5.5 | 37 | 57 | 45.3 |
| 5 | 19.0 | 6.0 | 39 | 59 | 50.6 |
| 6 | 20.7 | 6.5 | 41 | 60 | 54.6 |

TABLE V

| | Physical Properties of Molded Composites | | | |
|---|---|---|---|---|
| Specimen No. | Thickness (in.) | Density (gm/cm³) | Compressive Strength (psi) | Compressive Modulus* (psi) |
| 4 | 1.070 | 0.889 | 11,300 | — |
| 5 | 1.042 | 0.915 | 13,500 | 567,000 |
| 6 | 1.065 | 0.914 | 12,900 | 789,000 |

*Qualitative measure only, calculated from crosshead speed as indication of rate of compression.

EXAMPLE 4

The procedure of Example 1 was repeated using a series of resin/filler formulations containing different fillers and filler ratios. The compositions of the filler formulations are summarized in Table VI, while the physical properties of the molded composite slabs are summarized in Table VII. The definitions of Table I apply to Table VII. With regard to Table VI, the following definitions apply:

a. Carbospheres are carbon microspheres having a specific gravity of 0.32 and a mean diameter of 50 micrometers, available from Versar Corporation.

b. HM-S 50 (50μ) graphite fibers are graphite fibers having a length of about 50 micrometers and a diameter of about 8 micrometers, available from the Courtaulds Co. of the United Kingdom.

c. ¼ mm HM-S 50 graphite fibers are graphite fibers having a length of about 250 micrometers and a diameter of about 8 micrometers, available from the Courtaulds Co. of the United Kingdom.

d. C15/250 glass microballoons are composed of borosilicate glass, have a diameter of 10–200 micrometers, a density of 0.15 gm/cm³, and a compressive strength of 250 psi, available from the 3M Company of Minnesota.

TABLE VI

| | | Composition of Filler Formulations | | | | |
|---|---|---|---|---|---|---|
| Filler No. | Density (gm/cm³) | Carbosphere Microballoons (gms) | HM-S 50 50μ graphite fiber (gms) | ¼ mm HM-S 50 graphite fiber (gms) | C15/250 glass microballoons (gms) | Titanate Wetting Agent KR238M (gms) | Titanate Wetting Agent KR55 (gms) |
| A | 0.543 | 50 | 50 | — | — | 1 | — |
| B | 0.328 | 20 | 15 | — | 10 | — | 0.5 |
| C | 0.387 | — | 4.4 | 45.6 | 25 | 1 | — |

TABLE VII

| | | | Physical Properties of Molded Composite Slabs | | |
|---|---|---|---|---|---|
| Filler No. used in molded Sample | Thickness (in.) | Density (gm/cm³) | Filler Ratio (Wt %) | Filler Ratio (Vol. %) | Resin Bleed % |
| A | 0.443 | 1.050 | 39 | 59 | 51.0 |
| B | 0.540 | 0.753 | 26–47 | 56–77 | 61.9 |
| C | 0.850 | 0.948 | 27 | 54 | 16.2 |

The surfaces of the molded composite slabs of Table VII were then subjected to plasma treatment under the following conditions: O₂/inert gas source of approximately 1000 ml/minute, vacuum pressure of 200μ mercury, and one hour duration. The surfaces of the plasma-treated slabs were then copper plated to a thickness of about 3–4 mils by dipping the etched slabs in an aqueous Shipley #328 electroless copper plating bath.

The plated composite was then evaluated for adhesion of the deposited copper layer using the ASTM D3359 tape adhesion test and thermal shock cycle of Example 1. The adhesion results are recorded in Table VIII below.

TABLE VIII

| Molded Slab Containing Filler No. | Adhesion Results Amount Cu Coating On Lattice Removed by Tape |
|---|---|
| A | ≦5% |
| B | ≦5% |
| C | 5–15% |

EXAMPLE 5

The procedure of Example 1 was repeated using the following filler mix which had a density of 0.572:

| Filler Component | Weight |
|---|---|
| Carbosphere microballoons | 15.0 gm |
| HM—S 50 100 μm graphite fibers | 14.0 gm |
| HM—S 50 250 μm graphite fibers | 2.2 gm |
| Silar SC-9 SiC whiskers | 9.0 gm |
| KR238M wetting agent | 0.25 gm |

The HM-S 50 graphite fibers are graphite fibers having lengths of 100 μm or 250 μm as noted above and a diameter of about 8 micrometers, available from the Courtaulds Co. of the United Kingdom. The Silar SC-9 whiskers are silicon carbide whiskers having a length of about 10 to 80 micrometers and a diameter of about 0.8 micrometers, available from ARCO Metals Company. A silane coupling agent was applied to the fibers and whiskers. The carbospheres are as defined in Example 4.

The physical properties of the molded composite slab are as follows:

| Property | Value |
|---|---|
| Thickness | 0.264 in. |
| Density | 1.043 gm/cm$^3$ |
| Filler Ratio | |
| Wt. % | 34 |
| Vol. % | 52 |
| Resin Bleed | 30% |
| Flexural Strength | 8,840 psi |
| Flexural Modulus | 1,140,000 psi |

EXAMPLE 6

This example illustrates the encapsulation of an electrical comonent using the process of the present invention.

A heat curable epoxy resin formulation was prepared as disclosed in my U.S. Pat. No. 4,559,272 and had the following composition:

| Resin Composition | WT. (gm) |
|---|---|
| Diglycidylaniline | 100 |
| Methyl tetrahydrophthalic anhydride | 114 |
| Stannous Octoate | 3 |

A standard test magnetic coil comprising 2 layers of copper winding separated by 3 mils of insulation and having a length of 2 inches (5.08 cm) and a diameter of 1 inch (2.54 m) was loaded into a cleaned steel mold which was 3 inches (7.62 cm) wide and 7.25 inches (18.4 cm) long. The transfer press was evacuated to one millimeter of mercury or less absolute and was preheated to and maintained at 212° F. (100° C.), the temperature at which hardening of the heat curable epoxy resin formulation was initiated. The mold was placed in a transfer press and two hundred grams of the epoxy resin formulation noted above were metered under vacuum into the mold containing the coil. A vacuum of 1–4 millimeters (mm) mercury pressure was applied to the mold and maintained on the assembly for 2 minutes to impregnate the coil and degas the resin materials in the mold. The vacuum was then released and the assembly held in this passive vacuum state for an additional 2 minutes. Thereafter a constant positive pressure of approximately 90 psi (6.21×10$^5$ pascals) was imposed on the coil/resin system in the mold for 2 hours at 212° F. (100° C.). During this pressurization stage, it was estimated that about 50% by weight of the resin was bled from the mold. The encapsulated coil having a 2 mil layer of resin thereon was removed from the mold whereafter it was post cured for 3 hours in an oven set at 275° F. (135° C.).

The resistance of the encapsulated coil to electrical stress is recorded in Table IX below.

TABLE IX

| Parameter | Value |
|---|---|
| Breakdown voltage (KRMS)[1] | 6.93 |
| 30 second counts at Peak Heights (PC)[2] | 0 |
| 2.0 | 0 |
| 5.0 | 0 |
| 10.0 | 0 |
| 20.0 | 0 |
| 50.0 | 0 |
| Total counts (PC/sec)[3] | 0 |
| Electrical Stress (V/mil) | 2310 |

[1]Breakdown voltage is the voltage at which the insulation breaks down, and is a measure of the short-term dielectric strength of the insulator. It is measured by applying an AC voltage until arc-over through the insulation occurs.
[2]PC (picocoulombs) is a measure of energy and is measured with a Biddle Corona Tester and Discharge Energy Counter. The material is tested for a 30-second count, which is a convenient time period for establishing the discharge rate of picocoulombs/second. The number of peak heights of a given value of picocoulombs is measured for 30 seconds. A pass/fail criterion is used, with a value of over 100 failing.
[3]Total counts is a calculated average of the values measured in the 30-second counts noted above.

Although variations are shown in the present application, many modifications and ramifications will occur to those skilled in the art upon a reading of the present disclosure. These, too, are intended to be included herein. In particular, other materials besides those specifically described herein may be used in the method of the present invention by adjusting certain process details, such as curing temperatures, dwell time, and post-cure conditions, in accordance with information known in the art about such materials. Further, the particular subatmospheric and superatmospheric pressures and the temperatures used in the method of the present invention may be altered to be compatible with the particular resin, filler material, or electrical component being processed.

What is claimed is:

1. A method for forming a resin based filler reinforced composite article which comprises the steps of:
   (a) providing a rigid mold having a cavity therein and an opening in one surface of said mold and communicating with said cavity;

(b) providing a chamber for containing said mold and for applying heat and varying pressures to said cavity of said mold;

(c) heating said chamber to a predetermined temperature and maintaining said temperature in said chamber;

(d) loading a quantity of a particulate filler material in said cavity of said mold;

(e) loading said mold containing said filler into said heated chamber;

(f) filling the mold cavity with a low viscosity heat curable themosetting resin which cures at said predetermined temperature;

(g) evacuating the mold cavity to a subatmospheric pressure within the range of about 1 to 200 millimeters of mercury for about 1 to 5 minutes, to impose a vacuum on the mold to thereby impregnate the filler material with the resin, degas the mold contents, and expand any remaining voids in the resin;

(h) releasing the vacuum to atmospheric pressure to collapse any gas bubbles remaining in the mold contents;

(i) applying a superatmospheric pressure within the range of about 100, to 1000 pounds per square inch (about $6.90 \times 10^5$ to $6.90 \times 10^6$ pascals) for about 1 to 2 hours, to the mold to burst any said gas bubbles and cause the heat curable resin to compact and encapsulate particles of the filler loaded in the mold, the temperature and the superatmospheric pressure being maintained for a time sufficient to partially cure the resin and form a unitary structure;

(j) ejecting the structure from the mold cavity; and (k) subjecting the ejected structure to a further heating cycle to completely cure the resin.

2. The method of claim 1 wherein the heat curable resin is selected from the group consisting of an epoxy resin, a polyimide resin and a bismaleimide resin.

3. The method of claim 1 wherein the heat curable resin is an epoxy resin comprising a mixture of a polyglycidyl aromatic amine and a polycarboxylic acid anhydride curing agent.

4. The method of claim 3 wherein the polyglycidyl aromatic amine is diglycidyl orthotoluidine and the polycarboxylic acid anhydride curing agent is nadic methyl anhydride.

5. The method of claim 3 wherein the polyglycidyl aromatic amine is diglycidyl aniline and the polycarboxylic anhydride curing agent is methyl tetrahydrophthalic anhydride.

6. The method of claim 3 wherein the structure ejected from the mold is heated at about 250° (121° C.) to about 350° F. (177° C.) for about 1.25 to about 4 hours.

7. The method of claim 1 wherein the filler material comprises fibers and hollow microspheres, the fibers being formed of a material selected from the group consisting of graphite, glass, carbon, ceramic, and polyamide, and the microspheres being formed of a material selected from the group consisting of glass, silica, phenolic and carbon.

8. The method of claim 7 wherein said fibers comprise whiskers formed of a material selected from the group consisting of silicon carbide, silicon nitride, and sapphire.

9. The method of claim 3 wherein the mold is heated to a curing temperature of about 150° F. (66° C.) to about 250° F. (121° C.).

10. The method of claim 1 wherein the heat curable resin is an epoxy resin and the completely cured epoxy resin unitary structure is subsequently electrolessly plated with copper.

11. The method of claim 1 wherein the heat curable resin is an epoxy resin and the time sufficient to partially cure the resin is about 1 to 2 hours.

12. The method set forth in claim 1 which further includes:

(a') providing a second or subsequent rigid mold;

(b') loading a second or subsequent quantity of particulate filler in said cavity of said second or subsequent mold;

(c') following said ejecting of step "j", repeating steps "e" through "k" with said second or subsequent mold, whereby said method is performed in cyclic fashion to form continuously in sequence a plurality of said resin based filler reinforced composite articles.

13. The method set forth in claim 1 wherein prior to said filling of step "f", said chamber is evacuated to a pressure of about one millimeter of mercury or less and subsequently said filling occurs under said vacuum.

14. The method of claim 1 wherein said filler material is loaded in the mold cavity concurrent with the filling of the mold cavity with the resin and prior to the loading of said mold into said chamber in step "e".

15. A method for encapsulating an electrical component which comprises the steps of:

(a) providing a rigid mold having a cavity therein and an opening in one surface of said mold and communicating with said cavity;

(b) providing a chamber for containing said mold and for applying heat and varying pressures to said cavity of said mold;

(c) heating said chamber to a predetermined temperature and maintaining said temperature in said chamber;

(d) loading the component in said cavity of said mold;

(e) loading said mold containing said component into said heated chamber;

(f) filling the mold cavity with a low viscosity heat curable thermosetting resin which cures at said predetermined temperature;

(g) evacuating the mold cavity to a subatmospheric pressure within the range of about 1 to 4 millimeters of mercury for about 1 to 5 minutes, to impose a vacuum on the mold to thereby impregnate the component with the resin, degas the mold contents, and expand any remaining voids in the resin;

(h) releasing the vacuum to atmospheric pressure to collapse any gas bubbles remaining in the mold contents;

(i) applying a superatmospheric pressure within the range of about 50 to 100 pounds per square inch (about $3.45 \times 10^5$ to $6.90 \times 10^5$ pascals) for about 30 minutes to 3 hours, to the mold to burst any said gas bubbles and cause the heat curable resin to encapsulate the component loaded in the mold, the temperature and the superatmospheric pressure being maintained for a time sufficient to partially cure the resin and form a unitary structure;

(j) ejecting the structure from the mold cavity; and (k) subjecting the ejected structure to a further heating cycle to completely cure the resin.

16. The method set forth in claim 15 which further includes subsequent to said ejecting of step "j", loading a second or subsequent component into said mold cavity through said opening in said mold and repeating steps "e" through "k" for said second or subsequent component whereby said method is performed in cyclic fashion to form continuously in sequence a plurality of encapsulated said electrical components.

17. The method set forth in claim 15 wherein prior to said filling of step "f", said chamber is evacuated to a pressure of about one millimeter of mercury or less and subsequently said filling occurs under said vacuum.

18. The method of claim 15 wherein the heat curable resin is an epoxy resin and the time sufficient to partially cure the resin is about 0.5 to about 3 hours.

19. The method of claim 15 wherein the heat curable resin is selected from the group consisting of an epoxy resin, a polymide resin and a bismaleimide resin.

20. The method of claim 15 wherein the heat curable resin is an epoxy resin comprising a mixture of a polyglycidyl aromatic amine and a polycarboxylic acid anhydride curing agent.

21. The method of claim 20 wherein the polyglycidyl aromatic amine is diglycidyl orthotoluidine and the polycarboxylic acid anhydride curing agent is nadic methyl anhydride.

22. The method of claim 20 wherein the polyglycidyl aromatic amine is diglycidyl aniline and the polycarboxylic anhydride curing agent is methyl tetrahydrophthalic anhydride.

23. The method of claim 20 wherein the structure ejected from the mold is heated at about 250° (121° C.) to about 350° F. (177° C.) for about 1.25 to about 4 hours.

24. The method of claim 20 wherein the mold is heated to a curing temperature of about 150° F. (66° C.) to about 250° F. (121° C.).

25. The method of claim 15 wherein prior to loading the component in the mold cavity, a predetermined quantity of filler material is loaded in the mold cavity whereby the unitary structure comprises the electrical component encapsulated and impregnated with the resin and coated with a layer of a resin based filler reinforced composite.

* * * * *